United States Patent
Zhao

(10) Patent No.: US 9,965,102 B2
(45) Date of Patent: May 8, 2018

(54) VIRTUAL KEYBOARD SYSTEM AND TYPING METHOD THEREOF

(71) Applicant: SHENZHEN TCL NEW TECHNOLOGY CO., LTD, Shenzhen, Guangdong (CN)

(72) Inventor: Bo Zhao, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days. days.

(21) Appl. No.: 15/311,852

(22) PCT Filed: Dec. 12, 2014

(86) PCT No.: PCT/CN2014/093726
§ 371 (c)(1),
(2) Date: Nov. 17, 2016

(87) PCT Pub. No.: WO2016/019673
PCT Pub. Date: Feb. 11, 2016

(65) Prior Publication Data
US 2017/0097739 A1    Apr. 6, 2017

(30) Foreign Application Priority Data

Aug. 5, 2014  (CN) .......................... 2014 1 0381351

(51) Int. Cl.
*G06F 3/042* (2006.01)
*G09G 3/00* (2006.01)
(Continued)

(52) U.S. Cl.
CPC .......... *G06F 3/0426* (2013.01); *G06F 3/0418* (2013.01); *G06F 3/04886* (2013.01); *G09G 3/002* (2013.01)

(58) Field of Classification Search
None
See application file for complete search history.

(56) References Cited

U.S. PATENT DOCUMENTS

| 9,218,027 B2 * | 12/2015 | Miyashita | ............. G06F 1/1626 |
| 2013/0321279 A1 * | 12/2013 | Engle | .................. G06F 3/04886 345/168 |

(Continued)

FOREIGN PATENT DOCUMENTS

| CN | 102609192 A | 7/2012 |
| CN | 102750044 A | 10/2012 |

OTHER PUBLICATIONS

International Search Report of PCT Patent Application No. PCT/CN2014/093726 dated Apr. 8, 2015.

*Primary Examiner* — Kenneth B Lee, Jr.

(57) ABSTRACT

A virtual keyboard system and typing method are provided. The virtual keyboard system includes a projector configured for projecting a key area having keys onto a projection plane, a storage device configured for storing a key value mapping table, a typed position coordinate obtaining device configured for obtaining coordinates of a typed position of the key area, and a key value obtaining device configured for obtaining key values corresponding to the coordinates of the typed position from the key value mapping table. The key values are outputted when a projected virtual key area is touched by a user.

16 Claims, 15 Drawing Sheets

(51) Int. Cl.
    *G06F 3/041*     (2006.01)
    *G06F 3/0488*    (2013.01)

(56)  References Cited

U.S. PATENT DOCUMENTS

| | | | |
|---|---|---|---|
| 2015/0058782 A1* | 2/2015 | Kutliroff | G06F 3/04815 715/773 |
| 2015/0169134 A1* | 6/2015 | Givon | G06F 3/0425 345/175 |
| 2015/0193000 A1* | 7/2015 | Hu | G06F 3/017 345/156 |
| 2015/0355723 A1* | 12/2015 | Nakura-Fan | G06F 3/023 345/168 |

* cited by examiner

| Key value | Coordinate of key value |
|-----------|-------------------------|
| A | $C_2(0,0)$ |
| B | $C_2(0,1)$ |
| ... | ... |
| RETURN | $C_2(h, j-1)$ |
| OK | $C_2(h, j)$ |

VIRTUAL KEYBOARD SYSTEM AND TYPING METHOD THEREOF

FIELD OF THE INVENTION

The exemplary disclosure relates to a smart system and human-computer interaction field, and more particularly, to a virtual keyboard system and typing method thereof.

BACKGROUND OF THE INVENTION

With the progress and development of the science and technology, especially, the smart cloud computing technology and smart processing technology become popular and mature. Comparing to the past, the human-machine interaction (HMI) technology is not restricted to one-way mode, for example, interactions between a user and a TV set are not only realized using a remote controller, but also using gesture control and/or speech control. As more and more interactive ways become popular, a typical interactive mode which is mostly realized using the remote controller becomes inconvenient, and increasingly cannot meet convenient demands of the people. Therefore, there is room for improvement within the art.

DISCLOSURE OF THE INVENTION

The present invention is used for outputting key values using virtual keyboard.

The present invention provides a virtual keyboard system, the virtual keyboard system, comprising:

a projector configured for projecting a key area having keys onto a projection plane;

a storage device configured for storing a key value mapping table, wherein the key value mapping table being used for establishing a mapping relationship between coordinates of the keys of the key area and key values;

a typed position coordinate obtaining device configured for obtaining coordinates of a typed position of the key area; and a key value obtaining device configured for obtaining key values corresponding to the coordinates of the typed position from the key value mapping table.

In a preferred embodiment, the virtual keyboard system further comprising a displaying device for displaying the key values.

In the preferred embodiment, the coordinates of the keys fall within a range, and the coordinates of the typed position is the coordinates of a central point of the typed position, the key value obtaining device calculates an intersection set between coordinates of the central point of the typed position and the coordinates of the keys, so as to establish a relationship between the coordinates of the typed position and the coordinates of the keys, and obtain the key value corresponding to the area coordinates of the keys from the key value mapping table.

In the preferred embodiment, the typed position coordinate obtaining device comprises a first image obtaining module and a first coordinate obtaining module, wherein the first image obtaining module is configured for real-timely obtaining an image of the typed position, and the first coordinate obtaining module is configured for obtaining the coordinates of the typed position from the image of the typed position.

In the preferred embodiment, the first coordinate obtaining module obtains the coordinates of the centre point of the typed position from the image of the typed position, and the first coordinate obtaining module obtains the coordinates $B_1(a,b)$ of the centre point of the typed position using formulas as following: $a=m_{10}/m_{00}$, $b=m_{01}/m_{00}$, $$m_{pq} = \sum_{x=1}^{M} \sum_{y=1}^{N} x^p y^q f(x, y),$$

wherein M is a width of the image of the typed position, N is a height of the image of the typed position, p and q are natural numbers, $f(x, y)$ is a function of the image of the typed position, $m_{pq}$ is an image invariant moment of the image of the typed position.

In the preferred embodiment, wherein the typed position coordinate obtaining device further includes a first preprocessing module which is set between the first image obtaining module and the first coordinate obtaining module, and the first preprocessing module comprises a first correction unit, a first filtering unit, a first graying unit, a first threshold unit, and a first morphology unit, the first correction unit for correcting the image of the typed position, the first filtering unit is configured for filtering the image of the typed position, the first graying unit is configured for graying the image of the typed position, the first threshold unit is configured for thresholding the image of the typed position, and the first morphology unit is configured for morphologically processing the image of the typed position.

In the preferred embodiment, the first image obtaining module is an infrared wide angle lens.

In the preferred embodiment, the virtual keyboard system further comprises a key coordinate obtaining device and a mapping table update device, wherein the key coordinate obtaining device is configured for real-timely obtaining coordinates of the keys, and the mapping table update device is configured for updating the coordinates of the keys into the key value mapping table.

In the preferred embodiment, the key coordinate obtaining device comprises a second image obtaining module, a keyboard template matching module, a key template matching module, and a second coordinate obtaining module, wherein the second image obtaining module is configured for real-timely obtaining a panoramic image, the keyboard template matching module is configured for matching the panoramic image with a keyboard template image to obtain a keyboard image, the key template matching module is configured for matching the keyboard image with a key template image to obtain a key image, the second coordinate obtaining module is configured for obtaining the coordinates of keyboards from the key image, the panoramic image comprises a projection plane, an object and the key area when the key area is touched by an object, the keyboard image merely comprises an outline of the key area after the panoramic image is matched with the keyboard template image, and the key image comprises the key area having keys after the keyboard image is matched with the key template image.

In the preferred embodiment, the key coordinate obtaining device further comprises a keyboard template obtaining module, the keyboard template obtaining module comprises a third image obtaining unit and a keyboard template filtering unit, wherein the third image obtaining unit is configured for obtaining a first image of a projection plane before projection and a second image of the projection plane after projection, and the keyboard template filtering unit is configured for matching the first image of the projection plane with the second image of the projection plane to obtain a keyboard template image.

In the preferred embodiment, the second image obtaining module and the third image obtaining module are the infrared wide angle lens.

In the preferred embodiment, the keyboard template filtering unit 662 matches the first image of the projection plane with the second image of the projection plane using formulas as following:

$$KEY(x, y) = \sum_{x=1}^{M} \sum_{y=1}^{N} |I_q(x, y) - I_h(x, y)|; \text{ if}$$

$$\sum_{x=1}^{M} \sum_{y=1}^{N} |I_q(x, y) - I_h(x, y)| > T_1, \text{ then}$$

$$KEY(x, y) = 255; \text{ if } \sum_{x=1}^{M} \sum_{y=1}^{N} |I_q(x, y) - I_h(x, y)| < T_1,$$

then $KEY(x, y) = 0$;

wherein KEY $(x, y)$ is a function of the key template image, $I_q(x, y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is a height of the first image of the projection plane or the height of the first image of the projection plane, and $T_1$ is an empiric value.

In the preferred embodiment, the key coordinate obtaining device further comprises a second preprocessing module which is set between the second image obtaining module and the keyboard template matching module, the second preprocessing module comprises a second correction unit, a second filtering unit, a second graying unit, a second threshold unit, and a second morphology unit, the second correction unit for correcting the panoramic image, the second filtering unit is configured for filtering the panoramic image, the second graying unit is configured for graying the panoramic image, the second threshold unit is configured for thresholding the panoramic image, the second morphology unit is configured for morphologically processing the panoramic image.

In the preferred embodiment, the colorful image is converted into the grayscal image by using a formula as following: $A_{13}(x, y) = ((A_{12R}(x, y) + A_{12G}(x, y) + A_{12B}(x, y))/3$, and $A_{12R}(x, y)$ is a function of R component of the image before the image is grayed, $A_{12G}(x, y)$ is a function of G component of the image before the image is grayed, $A_{12B}(x, y)$ is a function of B component of the image before the image is grayed, and $A_{13}(x, y)$ is a grayed image.

In the preferred embodiment, the virtual keyboard system further comprises a positioning device, a rotating device and a controller, wherein the positioning device is configured for obtaining coordinates of the user, the rotating device is configured for driving the projector to rotate, and the controller is configured for controlling the rotating device to rotate according to the coordinates of the user.

In the preferred embodiment, the controller controls the rotating device to rotate using formulas as following: h= $\sqrt{x^2+y^2}$, $\alpha$=arg tan(x/y), $\alpha_0$=arg tan(x/h), $\beta$=$\alpha$−$\alpha_0$, wherein (x, y) are coordinates of the user relative to the projector located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector, and $\beta$ is a horizontal angle that the controller controls the rotating device to drive the projector to rotate at the horizontal plane.

The present invention provides a method for typing using a virtual keyboard, the method comprising:
 projecting a key area having keys onto a projection plane;
 providing a key value mapping table;
 real-timely obtaining coordinates of a typed position of the key area; and
 obtaining key values corresponding to the coordinates of the typed position from the key value mapping table.

In preferred embodiment, the method further comprising: displaying the key values.

In the preferred embodiment, wherein the coordinates of the keys fall within a range, and the coordinates of the typed position is the coordinates of a central point of the typed position, and step of obtaining the key values corresponding to the coordinates of the typed position from the key value mapping table further comprising:
 calculating an intersection set between coordinates of the central point of the typed position and the area coordinates of the keys;
 determining if the intersection set is empty;
 the typed position is invalid and a new typed position is needed, if the intersection set is empty;
 obtaining the key value corresponding to the area coordinates of the keys from the key value mapping table, if the intersection set is not an empty set.

In the preferred embodiment, step of obtaining the coordinates of the typed position of the key area further comprising:
 real-timely obtaining an image of the typed position; and
 obtaining the coordinates of the typed position from the image of the typed position.

In the preferred embodiment, the coordinates $B_1$ (a, b) of the centre point of the typed position are obtained from the image of the typed position using formulas as following: $a=m_{10}/m_{00}$, $b=m_{01}/m_{00}$, $$m_{pq} = \sum_{x=1}^{M} \sum_{y=1}^{N} x^p y^q f(x, y),$$

and M is a width of the image of the typed position, N is a height of the image of the typed position, p and q are natural numbers, $f(x, y)$ is a function of the image of the typed position, $m_{pq}$ is an image invariant moment of the image of the typed position.

In the preferred embodiment, step between step of real-timely obtaining an image of the typed position and step of obtaining the coordinates of the typed position from the image of the typed position comprising: preprocessing the image of the typed position.

In the preferred embodiment, step of preprocessing the image of the typed position comprising:
 correcting the image of the typed position;
 filtering the image of the typed position;

graying the image of the typed position;
thresholding the image of the typed position;
morphologically processing the image of the typed position.

In the preferred embodiment, step between step of providing the key value mapping table and step of real-timely obtaining coordinates of the typed position of the key area comprising:
real-timely obtaining coordinates of the keys; and
updating the coordinates of the keys into the key value mapping table.

In the preferred embodiment, step of real-timely obtaining coordinates of the keys further comprising:
real-timely obtaining a panoramic image;
matching the panoramic image with a keyboard template image to obtain a keyboard image;
matching the keyboard image with a key template image to obtain a key image; and
obtaining the coordinates of keyboards from the key image.

In the preferred embodiment, the keyboard image is obtained by:
obtaining a first image of a projection plane before projection and a second image of the projection plane after projection; and
matching the first image of the projection plane with the second image of the projection plane to obtain a keyboard template image.

In the preferred embodiment, the first image of the projection plane is matched with the second image of the projection plane using formulas as following:

$$KEY(x, y) = \sum_{x=1}^{M} \sum_{y=1}^{N} |I_q(x, y) - I_h(x, y)|; \text{ if }$$

$$\sum_{x=1}^{M} \sum_{y=1}^{N} |I_q(x, y) - I_h(x, y)| > T_1, \text{ then}$$

$$KEY(x, y) = 255; \text{ if } \sum_{x=1}^{M} \sum_{y=1}^{N} |I_q(x, y) - I_h(x, y)| < T_1,$$

then $KEY(x, y) = 0$;

wherein KEY (x, y) is a function of the key template image, $I_q(x, y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is a height of the first image of the projection plane or the height of the first image of the projection plane, $T_1$ is an empiric value.

In the preferred embodiment, step between step of real-timely obtaining a panoramic image and step of matching the panoramic image with a keyboard template image to obtain a keyboard image comprising: preprocessing the panoramic image.

In the preferred embodiment, step of preprocessing the panoramic image comprising:
correcting the panoramic image;
filtering the panoramic image;
graying the panoramic image;
thresholding the panoramic image; and
morphologically processing the panoramic image.

In the preferred embodiment, the colorful image is converted into the grayscal image by using a formula as following: $A_{13}(x, y)=((A_{12R}(x,y)+A_{12G}(x,y)+A_{12B}(x,y))/3$, and $A_{12R}(x, y)$ is a function of R component of the image before the image is grayed, $A_{12G}(x, y)$ is a function of G component of the image before the image is grayed, $A_{12B}(x, y)$ is a function of B component of the image before the image is grayed, and $A_{13}(x, y)$ is a grayed image.

In the preferred embodiment, step of projecting the key area having keys onto the projection plane comprising:
obtaining coordinates of the user and providing the key area having the keys to a position of the user; and
step of real-timely obtaining coordinates of the keys further comprising:
updating the keyboard template image;
updating the key template image;
real-timely obtaining a panoramic image;
matching the panoramic image with a keyboard template image to obtain a keyboard image;
matching the keyboard image with a key template image to obtain a key image; and
obtaining the coordinates of keyboards from the key image.

In the preferred embodiment, the key area having the keys is provided to the position of the user using formulas as following: $h=\sqrt{x^2+y^2}$, $\alpha=\arg \tan(x/y)$, $\alpha_0 =\arg \tan(x/h)$, $\beta=\alpha-\alpha_0$, wherein (x, y) are coordinates of the user relative to the projector located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector, and $\beta$ is a horizontal angle that the controller controls the rotating device to drive the projector to rotate at the horizontal plane.

The virtual keyboard system and typing method are provided. The virtual keyboard system includes the projector configured for projecting the key area having keys onto the projection plane, the storage device configured for storing a key value mapping table, the typed position coordinate obtaining device configured for obtaining coordinates of the typed position of the key area, and the key value obtaining device configured for obtaining key values corresponding to the coordinates of the typed position from the key value mapping table. The key values are outputted when the projected virtual key area is touched by a user.

Figure 1:
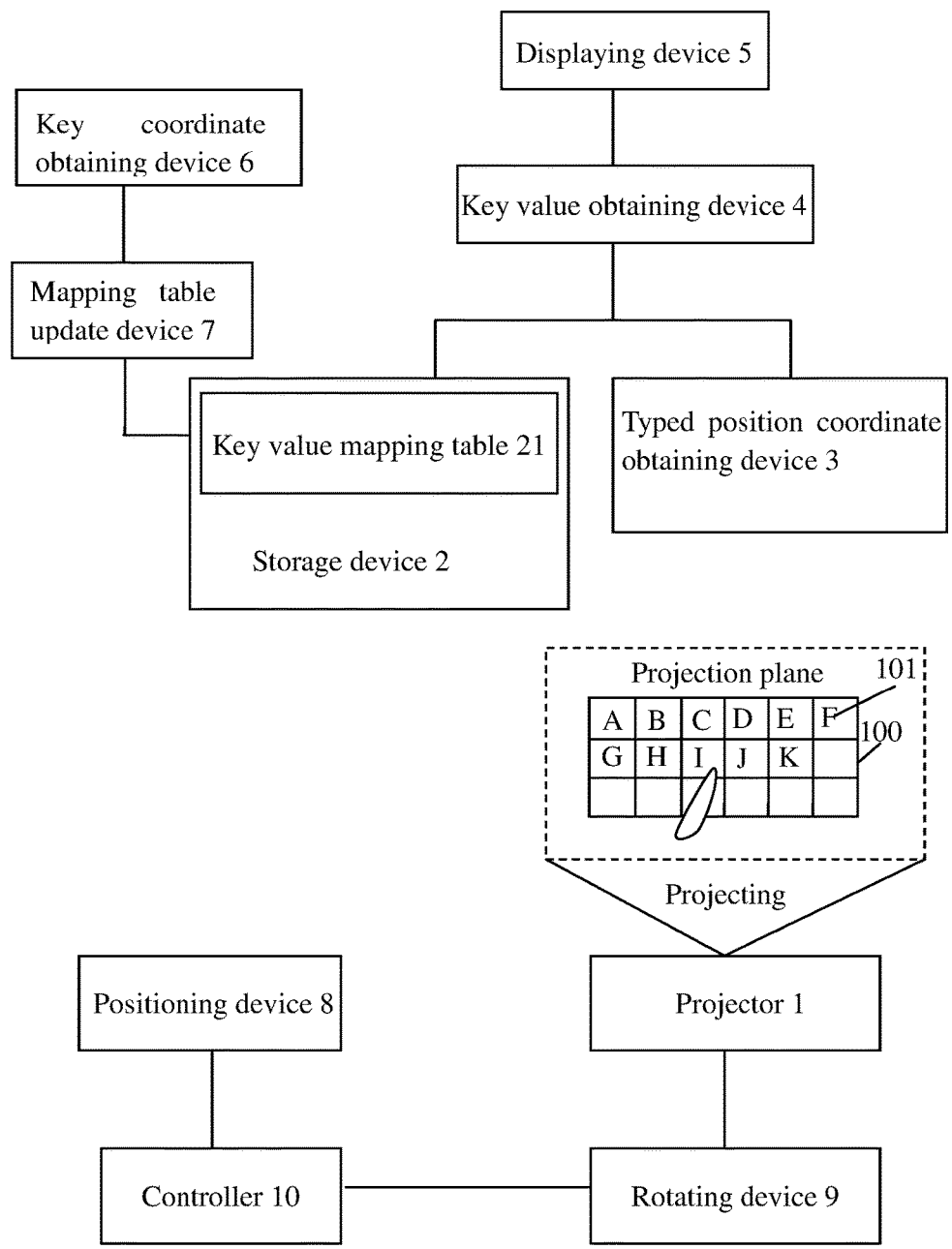
FIG. 1 is a schematic diagram of hardware configuration of a virtual keyboard system in accordance of one embodiment.

Other objects, advantages and novel features of the present invention will be drawn from the following detailed description and the attached drawings of embodiments.

DETAILED DESCRIPTION OF ILLUSTRATED EMBODIMENTS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

The present invention provides a virtual keyboard system, referring to FIGS. 1-7, in one embodiment, the virtual keyboard system includes:

a projector 1 configured for projecting a key area 100 having keys 101 onto a projection plane;

a storage device 2 configured for storing a key value mapping table 21, and the key value mapping table 21 is used for establishing a mapping relationship between coordinates of the keys 101 of the key area 100 and key values;

a typed position coordinate obtaining device 3 configured for obtaining coordinates of a typed position of the key area 100; and a key value obtaining device 4 configured for obtaining the key values corresponding to the coordinates of the typed position from the key value mapping table 21, so that the key values are outputted when the projected virtual key area 100 is touched by a user.

The virtual keyboard system further includes a displaying device 5 configured for displaying the key values which are typed by the user.

In one embodiment, the projector 1 may be, but not limited to, a laser. The laser projects a keyboard image which is the key area 100 onto a projection plane. The keyboard image includes, but not limited to, key images which are keys 101 (for example, key A, B, C as so on) for typing by the user. Obviously, the projector 1 may be other electronic device which is capable of projecting and generating the keyboard image and the key images.

Figures 2, 3:
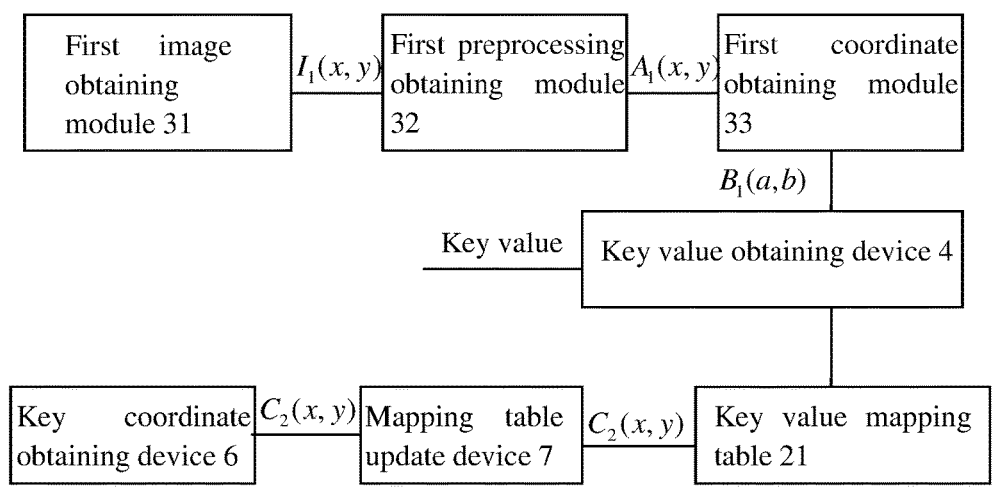
FIG. 2 illustrates one embodiment of a key value mapping table in FIG. 1.
FIG. 3 is a part of the schematic diagram of the hardware configuration of the virtual keyboard system in FIG. 1.

The key value mapping table 21 establishes a mapping relationship between the keys 101 (for example, key A, B, C as so on) and the coordinates of the keys 101 which fall within a coordinate range represented as area coordinates. In one embodiment, the key value mapping table 21 is shown in FIG. 2. Additionally, in different application scenarios of the key value mapping table 21, the coordinates and the key values of the keys 101 may be different.

The key value obtaining device 4 matches key values according to a containment relationship between coordinates of typed positions and the coordinates of the keys 101 as following:

If the coordinates of a typed position is the coordinates of a central point of the typed position, and the key value obtaining device 4 calculates an intersection set between coordinates of the central point of the typed position and the area coordinates of the keys 101. The intersection set is not an empty set when the coordinates of the central point of the typed position belongs to the area coordinates of the keys 101, the key value obtaining device 4 obtains a key value corresponding to the area coordinates of the keys 101 from the key value mapping table 21, the obtained key value is regarded as a typed key value. The complexity of the calculation can be reduced by calculating the intersection set between a point and an area.

Additionally, in present invention, the coordinates of the typed position also may be area coordinates. In such a situation, an overlap degree between two areas is calculated for comparing with a threshold value, if the overlap degree between two areas is greater than the threshold value, it is successfully matched that the typed key value is the key value corresponding to the area coordinates of the keys 101.

Referring to FIG. 3, specifically, the typed position coordinate obtaining device 3 includes, but not limited to, a first image obtaining module 31, and a first coordinate obtaining module 33. The first image obtaining module 31 is configured for real-timely obtaining an image $I_1(x, y)$ of the typed position. The first coordinate obtaining module 33 is configured for obtaining the coordinates $B_1(a,b)$ of the typed position from the image $I_1(x, y)$ of the typed position. The image $I_1(x, y)$ of the typed position is the image of the typed position which is obtained when the key area 100 is touched by an object.

In one embodiment, the object may be, but is not limited to, a fingertip. The first image obtaining module 31 may include, but not limited to, an infrared wide angle lens and an infrared laser. The infrared laser illuminates the fingertip, and the infrared wide angle lens saves a frame image of the fingertip at time intervals. The time intervals may be determined by a user.

Figure 4:
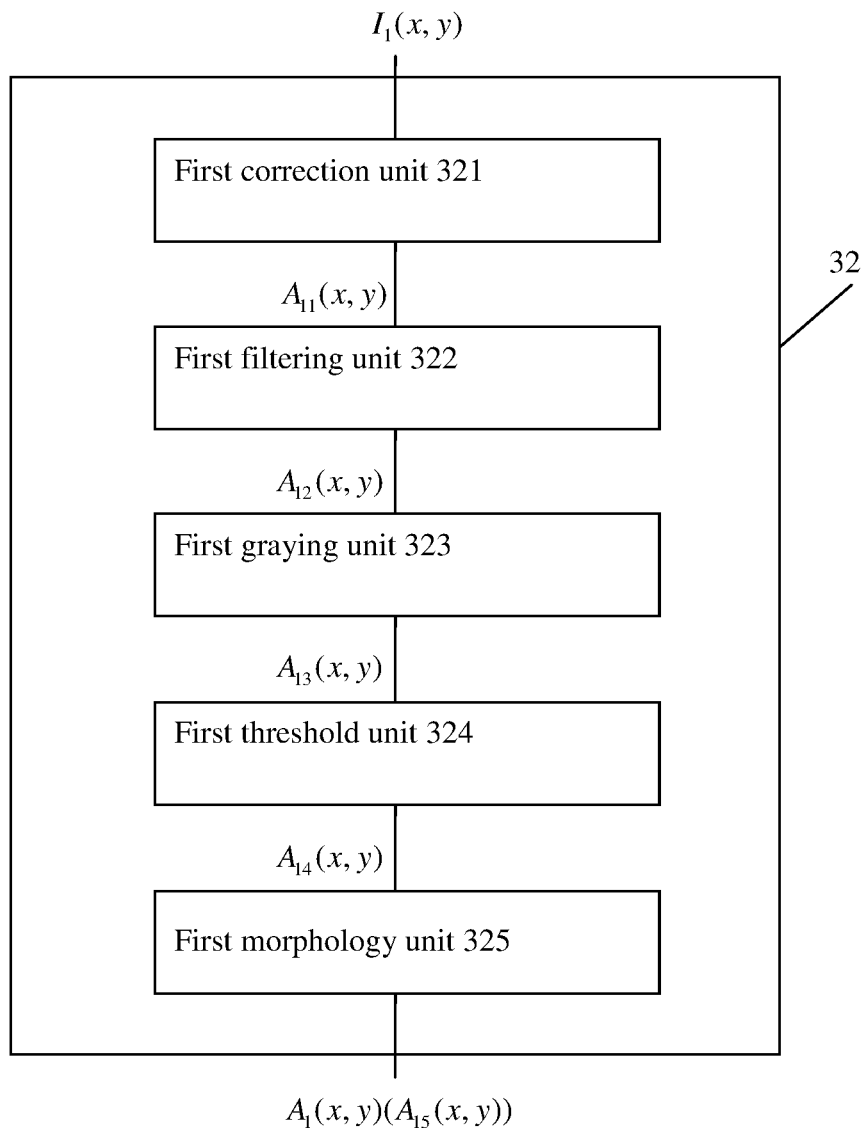
FIG. 4 is a schematic diagram of the hardware configuration of a first preprocessing module in the FIG. 3.
Figure 5:
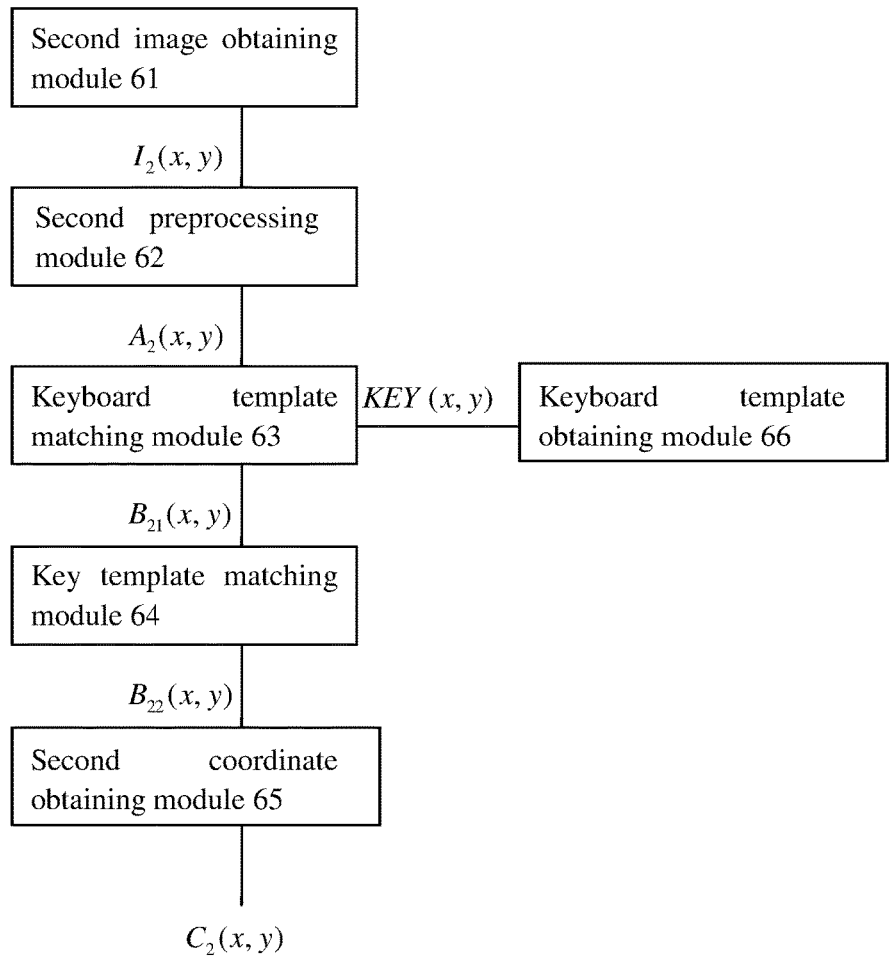
FIG. 5 is a schematic diagram of the hardware configuration of a key position obtaining device in the FIG. 3.

Referring to FIGS. 3 to 4, in one embodiment, the typed position coordinate obtaining device 3 further includes a first preprocessing module 32 which is set between the first image obtaining module 31 and the first coordinate obtaining module 33. The first preprocessing module 32 mainly preprocesses the image $I_1(x, y)$ to enhance the SNR (signal to noise ratio) of the image $I_1(x, y)$ and restrain background noise, so as to most truly restore information of the image $I_1(x, y)$ of the typed position. The first coordinate obtaining module 33 obtains the coordinates of the typed position on the base of the preprocessed image. The preprocessed image is represented as $A_1(x, y)$ after the image $I_1(x, y)$ is preprocessed by the first preprocessing module 32.

Specifically, the first preprocessing module 32 may include, but not limited to, a first correction unit 321, a first filtering unit 322, a first graying unit 323, a first threshold unit 324, and a first morphology unit 325. The first correction unit 321 for correcting the image of the typed position. The first filtering unit 322 is configured for filtering the image of the typed position. The first graying unit 323 is configured for graying the image of the typed position. The first threshold unit 324 is configured for thresholding the image of the typed position. The first morphology unit 325 is configured for morphologically processing the image of the typed position.

In one embodiment, generally, the image captured by the infrared wide angle lens is a little bit distorted. Due to changes of the image distortion being nonlinear, the coordinates of the fingertip are hardly calculated for applying to latter algorithm, thus the image need to be corrected.

The first correction unit 321 includes two parts, one part is used for image distortion correction, another part is used for image illumination correction. The image corrected by the first correction unit 321 is represented as $A_{11}(x, y)$.

In one embodiment, the image distortion correction and image illumination correction are widely used. The image illumination correction is mainly used for processing change information (for example, illumination change or angle change and so on) which is included in original specific image. Methods for the image illumination correction may include, but not limited to, a Gamma correction, a nonlinear transformation of the image illumination, a histogram equalization, and an illumination compensation algorithm using a maximum illumination point. The Gamma correction and nonlinear transformation of the image illumination nonlinearly adjust pixels of the image, so as to remove some of useless change information from the original specific image. The histogram equalization and illumination compensation algorithm using a maximum illumination point are used for adjusting contrast ratio of the image to enhance partial contrast ratio of the image.

The first filtering unit 322 may include, but not limited to, an image band pass filter and an image noise reduction filter. The image filtered by the first filtering unit 322 is represented as $A_{12}(x, y)$. In one embodiment, the infrared wide angle lens includes an infrared band pass filter and the laser is the infrared laser, thus, stray lights (most are visible lights) are filtered by the infrared wide angel lens and an infrared laser spot of the fingertip is left. The image noise reduction filter mainly removes noise information from the original image. Typically, the noise in the image may include, but not limited to, gaussian noise, salt-and-pepper noise, additive noise and so on. Methods for filtering the noise include, but not limited to, mean filtering, median filtering, gaussian filtering and so on.

The infrared wide angle lens obtains a colorful image which is represented by values of three components of a RGB model. However, the three components of the RGB model are highly associated with each other, it is hard to achieve desired effect by directly using the three components of the RGB model. Additionally, the three components of the RGB model increase the complexity of the calculation. Because the latter algorithm does not consider color information, the first graying unit 323 converts the colorful image into a grayscal image. The first graying unit 323 converts the colorful image into the grayscal image by using a formula as following: $A_{13}(x, y)=((A_{12R}(x, y)+A_{12G}(x, y)+A_{12B}(x, y))/3$, and $A_{12R}(x, y)$ is a function of R component of the image $A_{12}(x, y)$ which is transmitted to the first graying unit 323, $A_{12G}(x, y)$ is a function of G component of the image $A_{12}(x, y)$ which is transmitted to the first graying unit 323, $A_{12B}(x, y)$ is a function of B component of the image $A_{12}(x, y)$ which is transmitted to the first graying unit 323, and $A_{13}(x, y)$ is an image grayed by the first graying unit 323.

The first coordinate obtaining module 33 obtains the image of the typed position which is the image of the fingertip, and a binary image embodies more features than the grayscale image and is capable of accelerating a speed of the image processing, and the first threshold unit 324 thresholds the grayed image $A_{13}(x, y)$ to obtain a binary image $A_{14}(x, y)$. The first threshold unit 324 thresholds the grayed image using methods as following: a fixed thresholding method, an adaptive thresholding method, an up and down thresholding method, an otsu method (a clustering-based image thresholding method), an entropy method, an iterative method and so on.

The binary image $A_{14}(x, y)$ thresholded by the first threshold unit 324 may still include some isolated noise points or may include some interrupted points which should be connected. The first morphology unit 325 improves the binary image based on morphology. The improved image is represented as $A_{15}(x, y)$, which is also represented as $A_1(x, y)$. The morphology is known, and the present invention does not repeat a detailed description about the morphology.

The first coordinate obtaining module 33 obtains the coordinates of the centre point of the typed position from the image of the typed position. In detail, the first coordinate obtaining module 33 obtains the coordinates $B_1(a,b)$ of the centre point of the typed position using formulas as following: $a=m_{10}/m_{00}$, $b=m_{01}/m_{00}$, $$m_{pq} = \sum_{x=1}^{M} \sum_{y=1}^{N} x^p y^q f(x, y),$$

and M is a width of the image of the typed position, N is a height of the image of the typed position, p and q are natural numbers, $f(x, y)$ is a function of the image of the typed position, $m_{pq}$ is an image invariant moment of the image of the typed position.

In one embodiment, M is the width of the image $A_{15}(x, y)$, N is the height of the image $A_{15}(x, y)$, p and q are natural numbers, $f(x, y)$ is the function of the image $A_{15}(x, y)$, $m_{pq}$ is the image invariant moment of the image $A_{15}(x, y)$. Additionally, the image of the fingertip is extracted from the image $A_{15}(x, y)$ by an outline extraction method, and the coordinates $B_1(a,b)$ of the centre point of the typed position is obtained from the image of the fingertip. In such a situation, M is the width of the image of the fingertip, N is the height of the image of the fingertip, p and q are natural numbers, $f(x, y)$ is the function of the image of the fingertip, $m_{pq}$ is the image invariant moment of the image of the fingertip, and it is more accurate to calculate the coordinates $B_1(a,b)$ of the centre point of the typed position.

Referring to FIG. 1 and FIGS. 5-7, the virtual keyboard system further includes a key coordinate obtaining device 6 and a mapping table update device 7. The key coordinate obtaining device 6 is configured for real-timely obtaining coordinates of the keys 101. The mapping table update device 7 is configured for updating the coordinates of the keys 101 into the key value mapping table 21. Therefore, if a position or a size of the key area 100 are changed, the key value obtaining device 4 matches the coordinates of the typed position with the updated coordinates of the keys 101 in the key value mapping table 21, so as to obtain the key values which is typed by the user.

Specifically, the key coordinate obtaining device 6 includes a second image obtaining module 61, a keyboard template matching module 63, a key template matching module 64, a second coordinate obtaining module 65. The second image obtaining module 61 is configured for real-timely obtaining a panoramic image $I_2(x, y)$. The keyboard template matching module 63 is configured for matching the panoramic image with a keyboard template image to obtain a keyboard image $B_{21}(x, y)$. The key template matching module 64 is configured for matching the keyboard image with a key template image to obtain a key image $B_{22}(x, y)$. The second coordinate obtaining module 65 is configured for obtaining the coordinates $C_2(x, y)$ of keyboards from the key image. The keyboard image merely includes an outline of the key area 100 after the panoramic image is matched with the keyboard template image, the key image merely includes the key area 100 having the keys 101 after the keyboard image is matched with the key template image.

In one embodiment, the second image obtaining module 61 is a wide angle lens. The wide angle lens saves a frame of the panoramic image $I_2(x, y)$ at time intervals. The time intervals may be determined by the user. The panoramic image $I_2(x, y)$ includes the projection plane, the object and the key area 100 when the key area 100 is touched by the object.

The key coordinate obtaining device 6 further includes a second preprocessing module 62 which is set between the second image obtaining module 61 and the keyboard template matching module 63. The second preprocessing module 62 mainly preprocesses the image $I_2(x, y)$ to enhance the SNR (signal to noise ratio) of the image $I_2(x, y)$ and restrain background noise, so as to most truly restore information of the image $I_2(x, y)$. After the image $I_2(x, y)$ is preprocessed by the second preprocessing module 62, the preprocessed image is represented as $A_2(x, y)$.

Specifically, the second preprocessing module 62 includes, but not limited to, a second correction unit 621, a second filtering unit 622, a second graying unit 623, a second threshold unit 624, and a second morphology unit 625. The second correction unit 621 for correcting the panoramic image. The second filtering unit 622 is configured for filtering the panoramic image. The second graying unit 623 is configured for graying the panoramic image. The second threshold unit 624 is configured for thresholding the panoramic image. The second morphology unit 625 is configured for morphologically processing the panoramic image. Both the second preprocessing module 62 and the first preprocessing module 32 use the same method for preprocessing, the present invention does not repeat the description mentioned above. The image corrected by the second correction unit 621 is represented as $A_{21}(x, y)$, the image filtered by the second filtering unit 621 is represented as $A_{22}(x, y)$, the image grayed by the second graying unit 622 is represented as $A_{23}(x, y)$, the image thresholded by the threshold unit 624 is represented as $A_{24}(x, y)$, the image morphologically processed by the second morphology unit is represented by $A_{25}(x, y)$, which is also represented as $A_2(x, y)$ preprocessed by the second preprocessing module 62.

Furthermore, the key coordinate obtaining device 6 further includes a keyboard template obtaining module 66. The keyboard template obtaining module 66 include a third image obtaining unit 661, and a keyboard template filtering unit 662. The third image obtaining unit 661 is configured for obtaining a first image $I_h(x, y)$ of the projection plane before projection and a second image $I_q(x, y)$ of the projection plane after projection. The keyboard template filtering unit 662 is configured for matching the first image $I_h(x, y)$ of the projection plane with the second image $I_g(x, y)$ of the projection plane to obtain a keyboard template image KEY (x, y). The first image of the projection plane merely includes the projection plane, and the first image of the projection plane is obtained before the projector 1 projects the image of the key area 100 on the projection plane. The second image of the projection plane includes the projection plane and the key area 100, and the second image of the projection plane is obtained after the projector 1 projects the image of the key area 100 on the projection plane.

The keyboard template filtering unit 662 matches the first image of the projection plane with the second image of the projection plane using formulas as following:

$$KEY(x, y) = \sum_{x=1}^{M} \sum_{y=1}^{N} |I_q(x, y) - I_h(x, y)|; \text{ if}$$

$$\sum_{x=1}^{M} \sum_{y=1}^{N} |I_q(x, y) - I_h(x, y)| > T_1, \text{ then}$$

$$KEY(x, y) = 255; \text{ if } \sum_{x=1}^{M} \sum_{y=1}^{N} |I_q(x, y) - I_h(x, y)| < T_1,$$

then $KEY(x, y) = 0;$ where, KEY (x, y) is a function of the key template image, $I_q(x, y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is the height of the first image of the projection plane or the height of the first image of the projection plane, $T_1$ is an empiric value.

In one embodiment, the keyboard template matching module 63 takes KEY (x, y) as a template, and processes the image $A_{25}(x, y)$ which is also regarded as $A_2(x, y)$ using a template matching method, so as to obtain the image $B_{21}(x, y)$ which merely includes the keyboard, the image $B_{21}(x, y)$ is regarded as the keyboard template image. The template matching method is mature, and the present invention does not provide the description in detail here. The template matching method includes, but not limited to, a matching method of the difference between two squares, an association matching method, an association coefficient matching method, a matching method of the normalized difference between two squares, a normalized association matching method, a normalized association coefficient matching method and so on.

The key template matching module 64 processes each key 101 of the image $B_{21}(x, y)$ using the template matching method mentioned above to obtain the key image $B_{22}(x, y)$. Templates of the keys 101 are pre-stored into a storage unit of the displaying device 5. Furthermore, if a size of each template of the keys 101 is the same as a size of the keys 101, then one template of the keys 101 is enough. The template of the keys 101 is obtained by dividing the key template image KEY (x, y). The description on obtaining the template of the keys 101 by dividing the key template image KEY (x, y) is known, and the present invention does not provide the description in detail.

The second coordinate obtaining module 65 directly obtains coordinates of the keyboards according to the key image $B_{22}(x, y)$. The description on obtaining coordinates of the keyboards according to the key image $B_{22}(x, y)$ is known, and the present invention does not provide the description in detail.

Furthermore, the key area 100 may be set at a specific position. Each time when typing is needed, the user needs to enter into the specific position, the keyboard template image and the key template image are respectively obtained and saved into the storage device 2.

However, in practice, due to some special requirements of the user, the key area 100 may be movable. In such a situation, each time when the position of the key area 100 is changed, the keyboard template image and the key template image are required to be updated. In other words, the keyboard template image and the key template image are required to be reacquired. The following description in detail is provided on how to achieve a technical solution when the key area 100 is movable.

Figure 6:
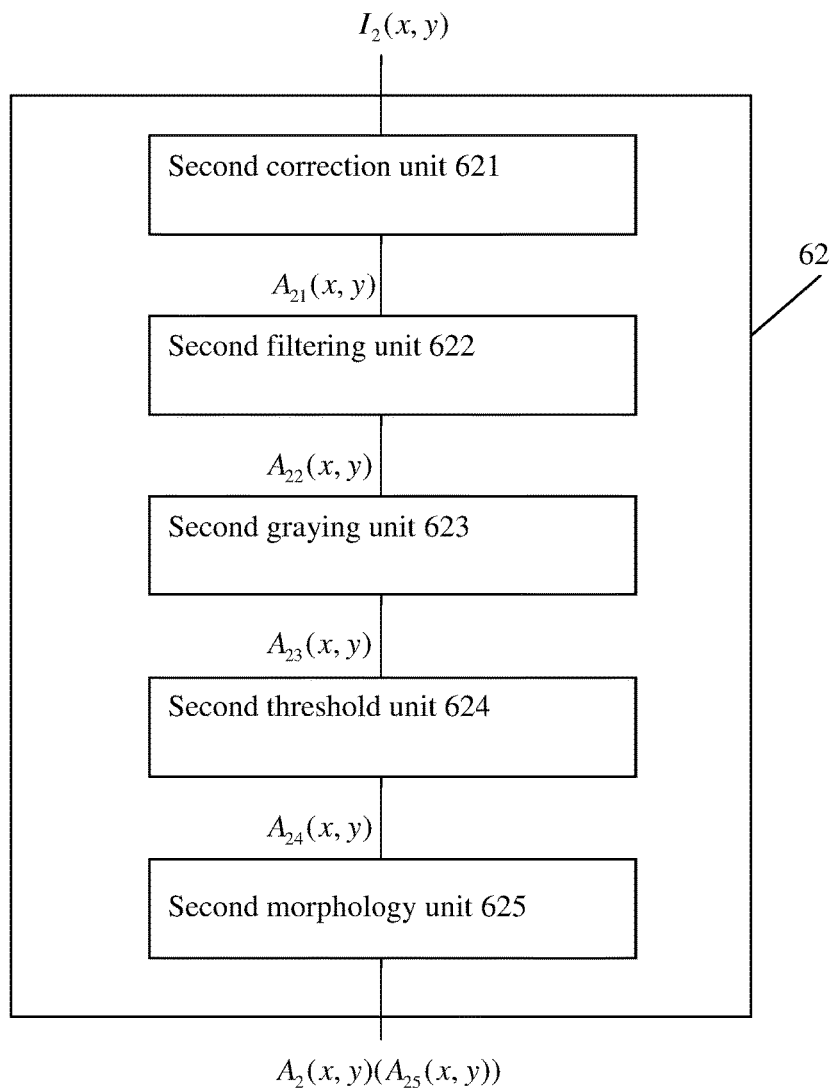
FIG. 6 is a schematic diagram of the hardware configuration of a second preprocessing module in the FIG. 5.
Figure 7:
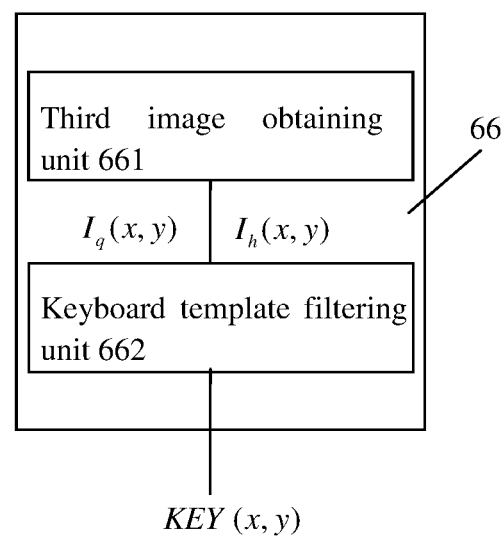
FIG. 7 is a schematic diagram of the hardware configuration of a key template obtaining module in the FIG. 5.

Referring to FIGS. 1 and 6, the virtual keyboard system further includes a positioning device 8, a rotating device 9, and a controller 10. The positioning device 8 is configured for obtaining coordinates of the user. The rotating device 9 is configured for driving the projector 1 to rotate. The controller 10 is configured for controlling the rotating device 9 to rotate according to the coordinates of the user. Therefore, the position of the key area 100 is adjusted so as to achieve typing by the user located at different position. Regarding updating the keyboard template image and the key template image, the method mentioned above can be used by the key template obtaining module 66, and the present invention does not repeat the description of the method mentioned above.

Figure 17:
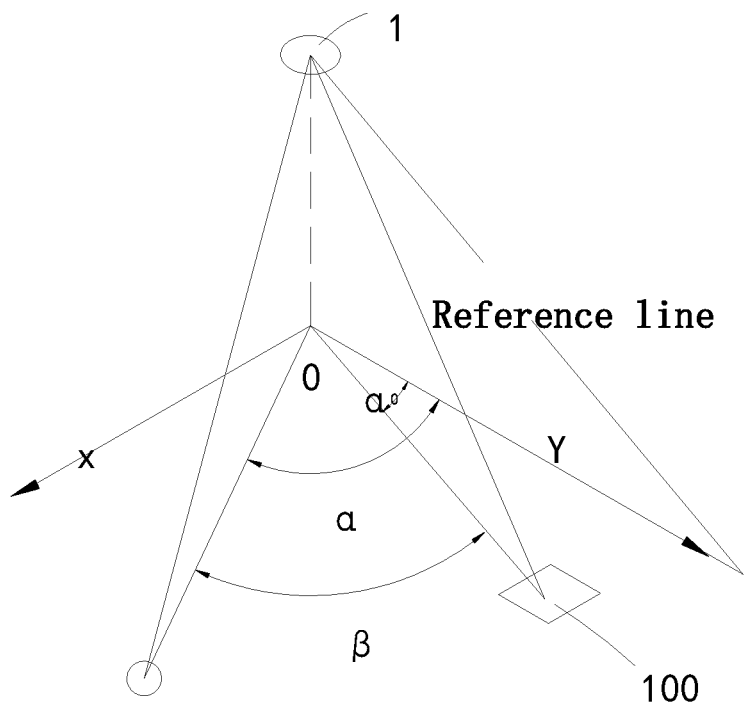
FIG. 17 illustrates one embodiment of a schematic diagram that a projector is rotated by a rotating device driven by a controller of the virtual keyboard system in FIG. 1.

Specifically, referring to FIG. 17, the controller 10 controls the rotating device 9 to rotate using formulas as following: $h = \sqrt{x^2+y^2}$, $\alpha = \arg \tan(x/y)$, $\alpha_0 = \arg \tan(x/h)$, $\beta = \alpha - \alpha_0$, where, (x,y) are coordinates of the user relative to the projector 1 located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector 1, and $\beta$ is a horizontal angle that the controller controls the rotating device to drive the projector to rotate at the horizontal plane.

The present invention provides a method for typing using a virtual keyboard, referring to FIGS. 8-14, in one embodiment, the method for typing using the virtual keyboard includes:

Step S02: projecting a key area 100 having keys 101 onto a projection plane;

Step S04: providing a key value mapping table 21, wherein the key value mapping table 21 being used for establishing a mapping relationship between coordinates of the keys 101 of the key area 100 and key values;

Step S06: obtaining coordinates of a typed position of the key area 100; and

Step S08: obtaining key values corresponding to the coordinates of the typed position from the key value mapping table 21.

Therefore, the key values are outputted when the projected key area 100 is touched by the user.

The method further includes step S10 as following: displaying the key values.

At step S02, the projector 1 projects the key area 100 having keys 101. In one embodiment, the projector 1 may be, but not limited to, an infrared laser. The infrared laser projects a keyboard image which is the key area 100 on a projection plane. The keyboard image includes, but not limited to, key images which are keys 101 (for example, key A, B, C) for typing by the user. Obviously, the projector 1 may be other electronic device which is capable of projecting the keyboard image and the key images.

At step S04, the key value mapping table 21 is stored in the storage device 2. The key value mapping table 21 includes a mapping relationship between the keys 101 (for example, A, B, C and so on) and the coordinates of the keys 101 which are also represented as area coordinates. In one embodiment, the key value mapping table 21 is shown in FIG. 2. Additionally, in different application scenarios of the key value mapping table 21, the coordinates and the key values of the keys 101 may be different.

The coordinates of the keys 101 fall within a range, and the coordinates of a typed position is the coordinates of a central point of the typed position, step S08 of obtaining key values corresponding to the coordinates of the typed position from the key value mapping table 21 further comprising:

calculating an intersection set between coordinates of the central point of the typed position and the area coordinates of the keys 101;

determining if the intersection set is empty;

the typed position is invalid and a new typed position is needed, if the intersection set is empty;

obtaining the key value corresponding to the area coordinates of the keys 101 from the key value mapping table, if the intersection set is not an empty set.

The complexity of the calculation can be reduced by calculating the intersection set between a point and an area. Obviously, the present invention is not limited in the description mentioned above, the coordinates of the typed position also may be area coordinates. In such a situation, an overlap degree between two areas is calculated for comparing with a threshold value, if the overlap degree between two areas is greater than the threshold value, it is successfully matched that the typed key value is the key value corresponding to the area coordinates of the keys 101.

Figure 9:
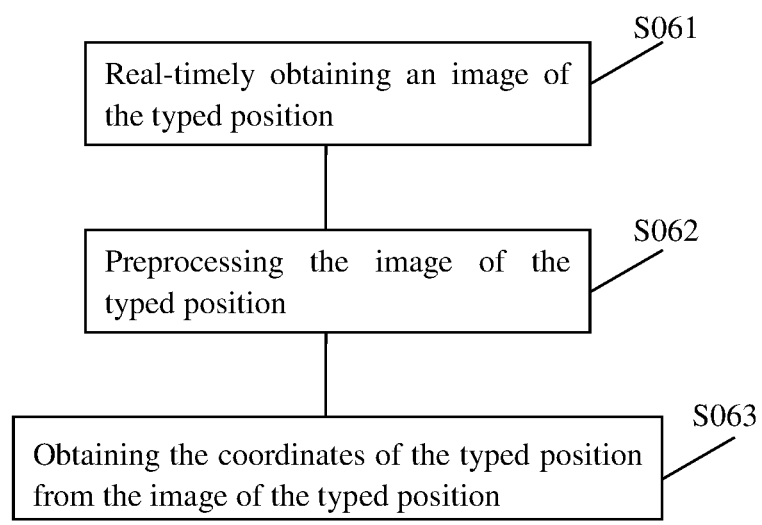
FIG. 9 is a flowchart of one embodiment of step S06 of the method in FIG. 8.
Figure 10:
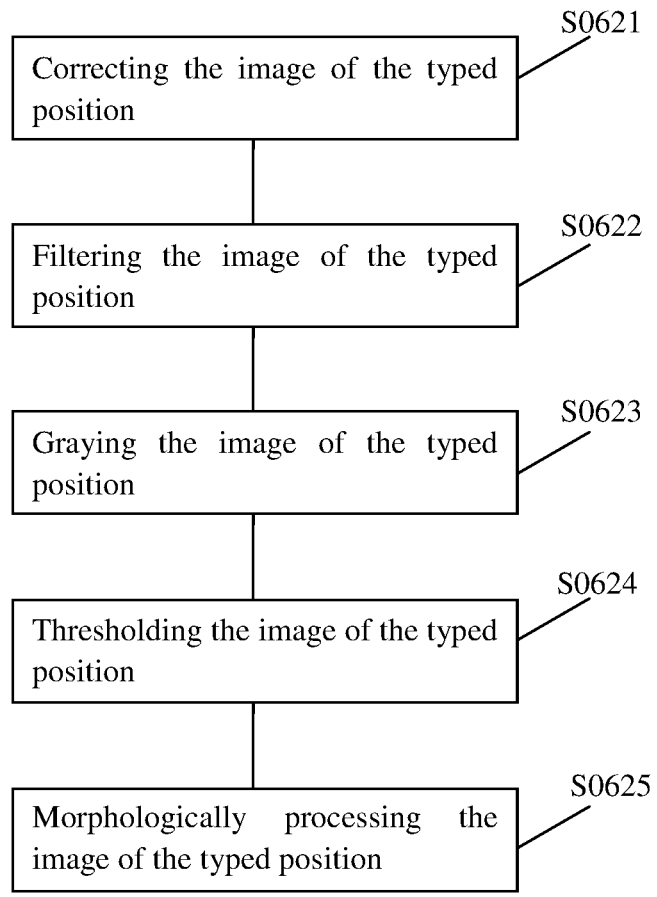
FIG. 10 is a flowchart of one embodiment of step S062 of step S06 in FIG. 9.

Referring to FIGS. 9 to 10, specifically, step S06 of obtaining coordinates of a typed position of the key area 100 further includes step S061, step S062 and step S063.

At step S061: real-timely obtaining an image $I_1(x, y)$ of the typed position. In one embodiment, the object is a fingertip of the user. The image $I_1(x, y)$ of the typed position is real-timely captured by the first image obtaining module 31 such as an infrared wide angle lens. The infrared wide angle lens saves a frame image of the fingertip at time intervals. The time intervals may be determined by a user.

At step S062: preprocessing the image of the typed position. The image $I_1(x, y)$ is mainly preprocessed to enhance the SNR (signal to noise ratio) of the image $I_1(x, y)$ and restrain background noise, so as to most truly restore information of the image $I_1(x, y)$. Step S063 is executed on the base of the preprocessed image. After the image is preprocessed in S063, the preprocessed image is represented as $A_1(x, y)$.

Specifically, step S062 further includes step S0621, step S0622, step S0623, step S0624, and step S0625.

At step S0621, correcting the image of the typed position. In one embodiment, the image captured by the infrared wide angle lens is a little bit distorted. Due to change of the image distortion being nonlinear, the coordinates of the fingertip are hardly calculated for applying to latter algorithm, thus the image need to be corrected.

The image of the typed position is corrected by two steps, one step is used for correcting distortion generated by the infrared wide angle lens, another step is used for image illumination correction. The image corrected by step S0621 is represented as $A_{11}(x, y)$. In one embodiment, the image distortion correction and image illumination correction are widely used. The image illumination correction mainly is used for processing change information (for example, illumination change or angle change) which is included in original specific image. A method for the image illumination correction may include, but not limited to, a Gamma correction, a nonlinear transformation of the image illumination, a histogram equalization, an illumination compensation algorithm using a maximum illumination point. The Gamma correction and nonlinear transformation of the image illumination nonlinearly correct pixels of the image, so as to remove some of useless change information from the original specific image. The histogram equalization and illumination compensation algorithm using a maximum illumination point are used for increasing contrast ratio of the image or enhancing partial contrast ratio of the image.

At step S0622, filtering the image of the typed position. In one embodiment, the image of the typed position is filtered by an image band pass filter and an image noise reduction filter. The image filtered by step S0622 is represented as $A_{12}(x, y)$. In one embodiment, the infrared wide angle lens includes an infrared band pass filter and the laser is the infrared laser, thus, stray lights (most are visible lights) are filtered by the infrared wide angel lens and an infrared laser spot of the fingertip is left. The image noise reduction filter mainly removes noise information from the original image. Typically, the noise in the image includes, but not limited to, gaussian noise, salt-and-pepper noise, additive noise and so on. Methods for filtering the noise include, but not limited to, mean filtering, median filtering, gaussian filtering and so on.

At step S0623, graying the image of the typed position. In one embodiment, the infrared wide angle lens obtains a colorful image which is represented by values of three components of a RGB model. However, the three components of the RGB model are highly associated with each other, it is hard to achieve desired effect directly using the three components of the RGB model. Additionally, the three components of the RGB model would increase complexity of the calculation. Because the latter algorithm does not consider color information, the colorful image is needed to be converted into a grayscal image. The colorful image is converted into the grayscal image by using a formula as following: $A_{13}(x, y) = ((A_{12R}(x, y) + A_{12G}(x, y) + A_{12B}(x, y))/3$, and $A_{12R}(x, y)$ is a function of R component of the image before the image is grayed, $A_{12G}(x, y)$ is a function of G component of the image before the image is grayed, $A_{12B}(x, y)$ is a function of B component of the image before the image is grayed, and $A_{13}(x, y)$ is a grayed image.

At step S0624, thresholding the image of the typed position. In one embodiment, the image of the typed position and the coordinate of the typed position are needed by the latter step S063, a binary image embodies more features than the grayscale image and accelerates to process the image, therefore, step S064 thresholds the grayed image $A_{13}(x, y)$ grayed by step S063 to obtain a binary image $A_{14}(x, y)$. Step S064 thresholds the grayed image using methods as following: a fixed thresholding method, an adaptive thresholding method, a up and down thresholding method, an Otsu method (a clustering-based image thresholding method), an entropy method, an iterative method and so on.

At step S0625, morphologically processing the image of the typed position. The binary image $A_{14}(x, y)$ thresholded by step S0625 may still include some isolated noise points or may include some interrupted points which should be connected. The first morphology unit 325 improves the binary image based on morphology. The improved image is represented as $A_{15}(x, y)$, which is also represented as $A_1(x, y)$ preprocessed by the first preprocessing module 32. The morphology is known, and the present invention does not repeat a detailed description about the morphology.

At step S063, obtaining the coordinates of the typed position from the image of the typed position. In one embodiment, the coordinates of the typed position is the coordinates of the centre point of the typed position. In one embodiment, the coordinates $B_1(a,b)$ of the centre point of the typed position are obtained from the image of the typed position using formulas as following: $a = m_{10}/m_{00}$, $b = m_{01}/m_{00}$, $$m_{pq} = \sum_{x=1}^{M} \sum_{y=1}^{N} x^p y^q f(x, y),$$

and M is a width of the image of the typed position, N is a height of the image of the typed position, p and q are natural numbers, $f(x, y)$ is a function of the image of the typed position, $m_{pq}$ is an image invariant moment of the image of the typed position.

In one embodiment, M is the width of the image $A_{15}(x, y)$, N is the height of the image $A_{15}(x, y)$, p and q are natural numbers, $f(x, y)$ is the function of the image $A_{15}(x, y)$, $m_{pq}$ is the image invariant moment of the image $A_{15}(x, y)$. Additionally, the image of the fingertip is extracted from the image $A_{15}(x, y)$ by an outline extraction method, and the coordinates $B_1(a,b)$ of the centre point of the typed position is obtained from the image of the fingertip. In such a situation, M is the width of the image of the fingertip, N is the height of the image of the fingertip, p and q are natural numbers, $f(x, y)$ is the function of the image of the fingertip, $m_{pq}$ is the image invariant moment of the image of the fingertip, and it is more accurate to calculate the coordinates $B_1(a, b)$ of the centre point of the typed position.

Figure 8:
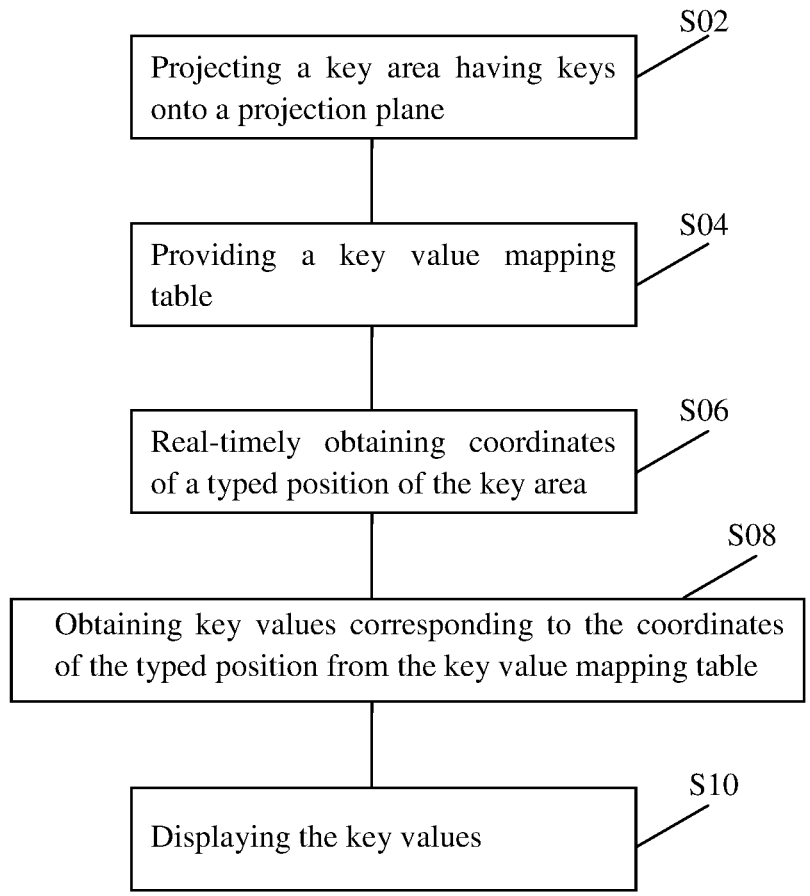
FIG. 8 is a flowchart of one embodiment of a method for typing using the virtual keyboard system.
Figure 11:
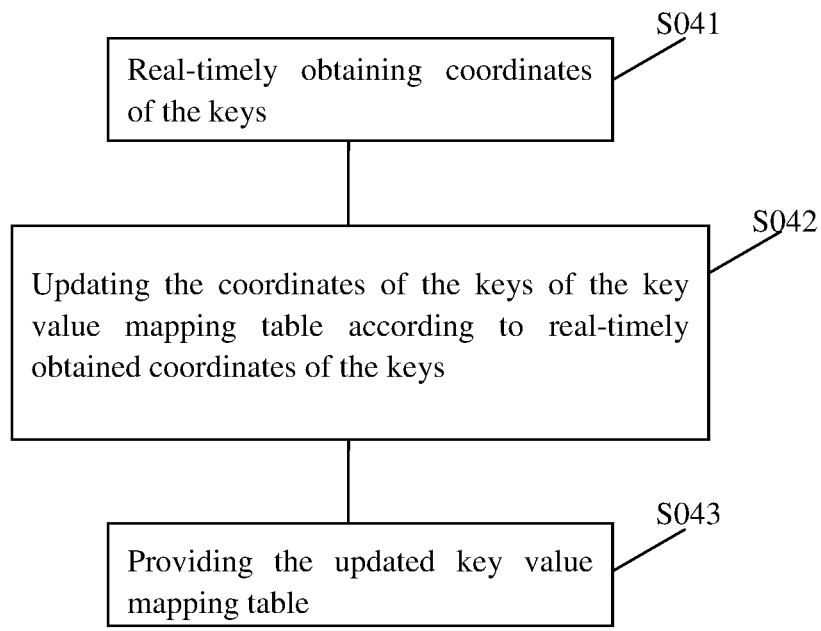
FIG. 11 is a flowchart of one embodiment of step S04 of the method in FIG. 8.
Figure 12:
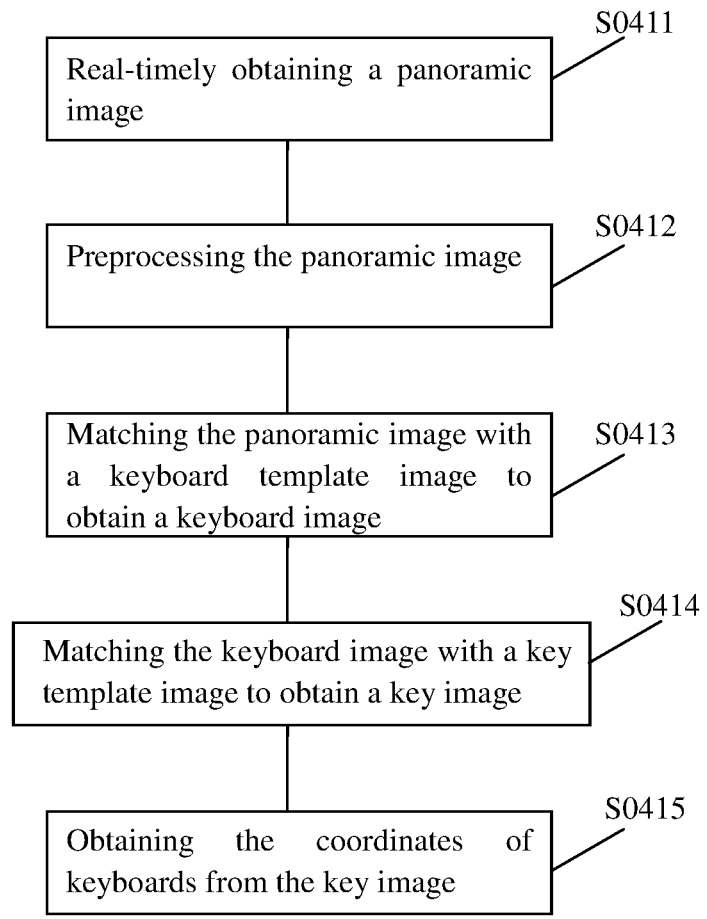
FIG. 12 is a flowchart of one embodiment of step S41 in FIG. 11.
Figure 13:
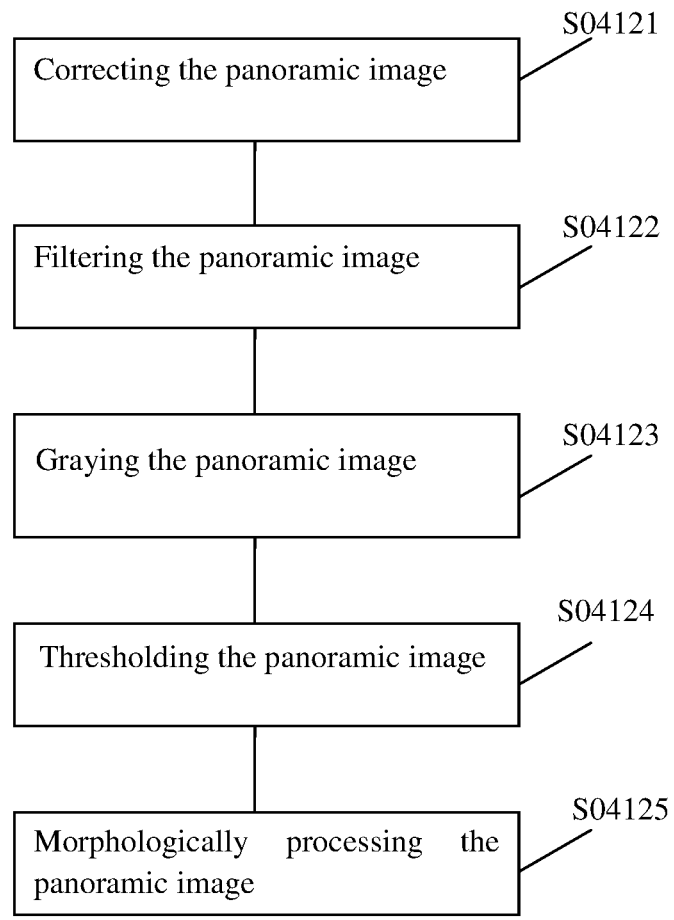
FIG. 13 is a flowchart of one embodiment of step S412 in FIG. 12.
Figure 14:
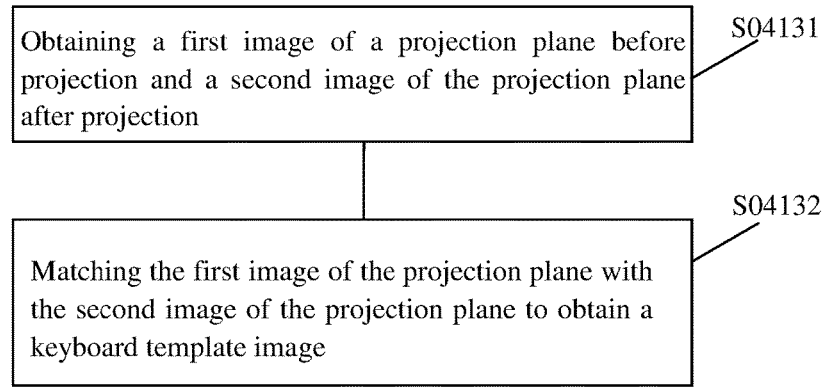
FIG. 14 is a flowchart of one embodiment of step S413 in FIG. 12.

Referring to FIGS. 8, 11 and 14, step S04 further includes:

Step S041: real-timely obtaining coordinates of the keys 101;

Step S042: updating the coordinates of the keys 101 into the key value mapping table 21; and Step S043: providing the updated key value mapping table 21.

At step S041: step of real-timely obtaining coordinates of the keys 101 further includes:

Step S0411: real-timely obtaining a panoramic image;
Step S0412: preprocessing the panoramic image;
Step S0413: matching the panoramic image with a keyboard template image to obtain a keyboard image;
Step S0414: matching the keyboard image with a key template image to obtain a key image.
Step S0415: obtaining the coordinates of keyboards from the key image.

Specifically, At step S0412: step of preprocessing the panoramic image further includes:

Step S04121: correcting the panoramic image;
Step S04122: filtering the panoramic image;
Step S04123: graying the panoramic image;
Step S04124: thresholding the panoramic image; and Step S04125: morphologically processing the panoramic image;

Step S0412 uses the same method as step S062, the present invention does not repeat the description mentioned above. The image preprocessed by S0412 is represented as $A_2(x, y)$. The image corrected by step S04121 is represented as $A_{21}(x, y)$, the image filtered by step S04122 is represented as $A_{22}(x, y)$, the image grayed by step S04123 is represented as $A_{23}(x, y)$, the image thresholded by step S04124 is represented as $A_{24}(x, y)$, the image morphologically processed by step S04125 is represented by $A_{25}(x, y)$, which is also represented as $A_2(x, y)$.

At step S0413, the keyboard template image is obtained using following steps:

Step S04131: obtaining a first image of a projection plane before projection and a second image of the projection plane after projection.

Step S04132: matching the first image of the projection plane with the second image of the projection plane to obtain a keyboard template image. The first image of the projection plane merely includes the projection plane, and the first image of the projection plane is obtained before the projector 1 projects the image of the key area 100 on the projection plane. The second image of the projection plane includes the projection plane and the key area 100, and the second image of the projection plane is obtained after the projector 1 projects the image of the key area 100 on the projection plane.

At step S04132: the first image of the projection plane is matched with the second image of the projection plane using formulas as following:

$$KEY(x, y) = \sum_{x=1}^{M} \sum_{y=1}^{N} |I_q(x, y) - I_h(x, y)|; \text{ if}$$

$$\sum_{x=1}^{M} \sum_{y=1}^{N} |I_q(x, y) - I_h(x, y)| > T_1, \text{ then}$$

$$KEY(x, y) = 255; \text{ if } \sum_{x=1}^{M} \sum_{y=1}^{N} |I_q(x, y) - I_h(x, y)| < T_1,$$

then $KEY(x, y) = 0$;

where, KEY (x, y) is a function of the key template image, $I_q(x, y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is a height of the first image of the projection plane or the height of the first image of the projection plane, $T_1$ is an empiric value.

At step S0413, KEY (x, y) is regarded as a template. The image $A_{25}(x, y)$ which is also regarded as $A_2(x, y)$ is processed using a template matching method, so as to obtain the image $B_{21}(x, y)$ which merely includes the keyboard, the image $B_{21}(x, y)$ is regarded as the keyboard template image. The template matching method is mature, and the present invention does not provide the description in detail here. The template matching method includes, but not limited to, a matching method of the difference between two squares, an association matching method, an association coefficient matching method, a matching method of the normalized difference between two squares, a normalized association matching method, a normalized association coefficient matching method and so on.

At step S0414: each key 101 of the image $B_{21}(x, y)$ is processed using the template matching method mentioned above to obtain the key image $B_{22}(x, y)$. Templates of the keys 101 are pre-stored into a storage unit of the displaying device 5. Furthermore, if a size of each template of the keys 101 is the same as a size of the keys 101, then one template of the keys 101 is enough. The template of the keys 101 is obtained by dividing the key template image KEY (x, y). The description on obtaining the template of the keys 101 by dividing the key template image KEY (x, y) is known, and the present invention does not provide the description in detail.

At step S0415: coordinates of the keyboards are directly obtained according to the key image $B_{22}(x, y)$. The description on obtaining coordinates of the keyboards according to the key image $B_{22}(x, y)$ is known, and the present invention does not provide the description in detail.

Furthermore, the key area 100 may be set as a specific position. Each time when typing is needed, the user needs to enter into the specific position, the keyboard template image and the key template image are respectively obtained and saved into the storage device 2.

However, in practice, due to some special requirements of the user, the key area 100 may be movable. In such a situation, each time when the position of the key area 100 is changed, the keyboard template image and the key template image are required to be updated. In other words, the keyboard template image and the key template image are required to be reacquired.

Figure 15:
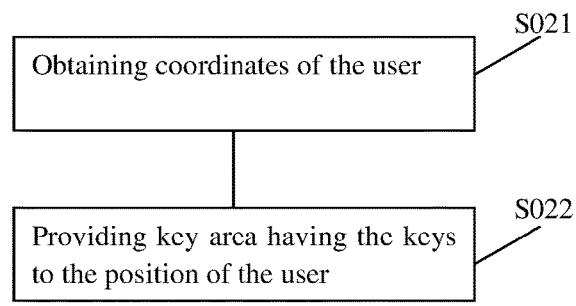
FIG. 15 is a flowchart of another embodiment of step S02 of the method.
Figure 16:
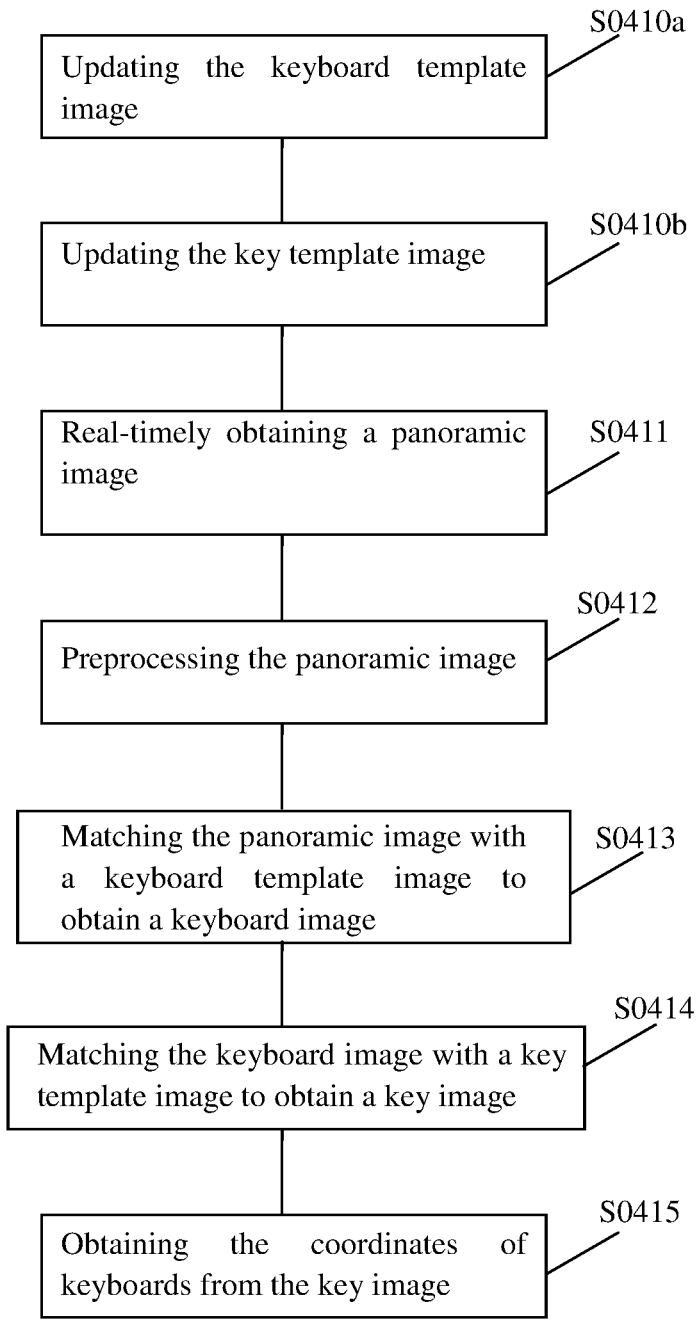
FIG. 16 is a flowchart of step S041 of the method in FIG. 15.

Referring to FIGS. 15 to 17, in another embodiment of the method for typing using the virtual keyboard, step S02 includes:

Step S021: obtaining coordinates of the user;
Step S022: providing key area 100 having the keys 101 to the position of the user.

Thus, the position of the key area 100 is adjusted so as to achieve typing by the user at different position.

The key area 100 having the keys 101 is provided to the position of the user using formulas as following: $h=\sqrt{x^2+y^2}$, $\alpha=\arg\tan(x/y)$, $\alpha_0=\arg\tan(x/h)$, $\beta=\alpha-\alpha_0$, where, (x,y) are coordinates of the user relative to the projector 1 located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector 1, and $\beta$ is a horizontal angle that the controller controls the rotating device to drive the projector to rotate at the horizontal plane.

Accordingly, meanwhile, step S0413 includes:
Step S0410a: updating the keyboard template image;
Step S0410b: updating the key template image;
Step S0411: real-timely obtaining a panoramic image;
Step S0412: preprocessing the panoramic image;
Step S0413: matching the panoramic image with a keyboard template image to obtain a keyboard image;
Step S0414: matching the keyboard image with a key template image to obtain a key image;
Step S0415: obtaining the coordinates of keyboards from the key image.

The key template image and the keyboard template image are updated using the method mentioned above.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A virtual keyboard system, comprising:
   a projector configured for projecting a key area having keys onto a projection plane;
   a storage device configured for storing a key value mapping table, wherein the key value mapping table being used for establishing a mapping relationship between coordinates of the keys of the key area and key values;
   a typed position coordinate obtaining device configured for obtaining coordinates of a typed position of the key area; and
   a key value obtaining device configured for obtaining key values corresponding to the coordinates of the typed position from the key value mapping table;
   a key coordinate obtaining device configured for real-timely obtaining coordinates of the keys; and
   a mapping table update device configured for updating the coordinates of the keys into the key value mapping table;
   the key coordinate obtaining device comprising
      a second image obtaining module configured for real-timely obtaining a panoramic image;
      a keyboard template matching module configured for matching the panoramic image with a keyboard template image to obtain a keyboard image;
      a key template matching module configured for matching the keyboard image with a key template image to obtain a key image; and
      a second coordinate obtaining module configured for obtaining the coordinates of keyboards from the key image;
   the panoramic image comprises a projection plane, an object and the key area when the key area is touched by an object;
   the keyboard image comprise an outline of the key area after the panoramic image is matched with the keyboard template image;
   the key image comprises the key area having keys after the keyboard image is matched with the key template image.

2. The virtual keyboard system of claim 1, wherein the coordinates of the keys fall within a range, and the coordinates of the typed position is the coordinates of a central point of the typed position, the key value obtaining device calculates an intersection set between coordinates of the central point of the typed position and the coordinates of the keys, so as to establish a relationship between the coordinates of the typed position and the coordinates of the keys, and obtain the key value corresponding to the area coordinates of the keys from the key value mapping table.

3. The virtual keyboard system of claim 1, wherein the typed position coordinate obtaining device comprises a first image obtaining module and a first coordinate obtaining module, wherein the first image obtaining module is configured for real-timely obtaining an image of the typed position, and the first coordinate obtaining module is configured for obtaining the coordinates of the typed position from the image of the typed position.

4. The virtual keyboard system of claim 3, wherein the first coordinate obtaining module obtains the coordinates of the centre point of the typed position from the image of the typed position, and the first coordinate obtaining module obtains the coordinates $B_1(a,b)$ of the centre point of the typed position using formulas as following: $a=m_{10}/m_{00}$, $b=m_{01}/m_{00}$, $$m_{pq} = \sum_{x=1}^{M} \sum_{y=1}^{N} x^p y^q f(x, y),$$

wherein M is a width of the image of the typed position, N is a height of the image of the typed position, p and q are natural numbers, $f(x, y)$ is a function of the image of the typed position, $m_{pq}$ is an image invariant moment of the image of the typed position.

5. The virtual keyboard system of claim 1, wherein the key coordinate obtaining device further comprises a keyboard template obtaining module, the keyboard template obtaining module comprises a third image obtaining unit and a keyboard template filtering unit, wherein the third image obtaining unit is configured for obtaining a first image of a projection plane before projection and a second image of the projection plane after projection, and the keyboard template filtering unit is configured for matching the first image of the projection plane with the second image of the projection plane to obtain a keyboard template image.

6. The virtual keyboard system of claim 5, wherein the keyboard template filtering unit 662 matches the first image of the projection plane with the second image of the projection plane using formulas as following:

$$KEY(x, y) = \sum_{x=1}^{M} \sum_{y=1}^{N} |I_q(x, y) - I_h(x, y)|; \text{ if}$$

$$\sum_{x=1}^{M} \sum_{y=1}^{N} |I_q(x, y) - I_h(x, y)| > T_1, \text{ then}$$

$$KEY(x, y) = 255; \text{ if } \sum_{x=1}^{M} \sum_{y=1}^{N} |I_q(x, y) - I_h(x, y)| < T_1,$$

then $KEY(x, y) = 0$;

wherein $KEY(x,y)$ is a function of the key template image, $I_q(x,y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is a height of the first image of the projection plane or the height of the first image of the projection plane, and $T_1$ is an empiric value.

7. The virtual keyboard system of claim 1, wherein the virtual keyboard system further comprises a positioning device, a rotating device and a controller, wherein the positioning device is configured for obtaining coordinates of the user, the rotating device is configured for driving the projector to rotate, and the controller is configured for controlling the rotating device to rotate according to the coordinates of the user.

8. The virtual keyboard system of claim 1, wherein the controller controls the rotating device to rotate using formulas as following:

$h=\sqrt{x^2+y^2}$, $\alpha=\arg\tan(x/y)$, $\alpha_0=\arg\tan(x/h)$, $\beta=\alpha-\alpha_0$, wherein (x, y) are coordinates of the user relative to the projector located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector, and $\beta$ is a horizontal angle that the controller controls the rotating device to drive the projector to rotate at the horizontal plane.

9. A method for typing using a virtual keyboard, the method comprising:
projecting a key area having keys onto a projection plane;
providing a key value mapping table;
real-timely obtaining coordinates of a typed position of the key area; and
obtaining key values corresponding to the coordinates of the typed position from the key value mapping table;
between a of providing the key value mapping table and a step of real-timely obtaining coordinates of the typed position of the key area, further comprising:
real-timely obtaining coordinates of the keys; and
updating the coordinates of the keys into the key value mapping table;
wherein a step of real-timely obtaining coordinates of the keys further comprising:
real-timely obtaining a panoramic image;
matching the panoramic image with a keyboard template image to obtain a keyboard image;
matching the keyboard image with a key template image to obtain a key image; and obtaining the coordinates of keyboards from the key image.

10. The method of claim 9, wherein the coordinates of the keys fall within a range, and the coordinates of the typed position is the coordinates of a central point of the typed position, and step of obtaining the key values corresponding to the coordinates of the typed position from the key value mapping table further comprising:
calculating an intersection set between coordinates of the central point of the typed position and the area coordinates of the keys;
determining if the intersection set is empty;
the typed position is invalid and a new typed position is needed, if the intersection set is empty;
obtaining the key value corresponding to the area coordinates of the keys from the key value mapping table, if the intersection set is not an empty set.

11. The method of claim 9, wherein step of obtaining the coordinates of the typed position of the key area further comprising:
real-timely obtaining an image of the typed position; and
obtaining the coordinates of the typed position from the image of the typed position.

12. The method of claim 11, wherein the coordinates $B_1(a,b)$ of the centre point of the typed position are obtained from the image of the typed position using formulas as following: $a=m_{10}/m_{00}$, $b=m_{01}/m_{00}$ $$m_{pq} = \sum_{x=1}^{M}\sum_{y=1}^{N} x^p y^q f(x, y),$$

and M is a width of the image of the typed position, N is a height of the image of the typed position, p and q are natural numbers, $f(x, y)$ is a function of the image of the typed position, $m_{pq}$ is an image invariant moment of the image of the typed position.

13. The method of claim 9, wherein the keyboard image is obtained by:
obtaining a first image of a projection plane before projection and a second image of the projection plane after projection; and
matching the first image of the projection plane with the second image of the projection plane to obtain a keyboard template image.

14. The virtual keyboard system of claim 13, wherein the first image of the projection plane is matched with the second image of the projection plane using formulas as following:

$$KEY(x, y) = \sum_{x=1}^{M}\sum_{y=1}^{N} |I_q(x, y) - I_h(x, y)|; \text{ if }$$

$$\sum_{x=1}^{M}\sum_{y=1}^{N} |I_q(x, y) - I_h(x, y)| > T_1, \text{ then}$$

$$KEY(x, y) = 255; \text{ if } \sum_{x=1}^{M}\sum_{y=1}^{N} |I_q(x, y) - I_h(x, y)| < T_1,$$

then $KEY(x, y) = 0$;

wherein KEY(x,y) is a function of the key template image, $I_q(x, y)$ is a function of the second image of the projection plane, $I_h(x, y)$ is a function of the first image of the projection plane, the width of the first image of the projection plane is equal to the width of the second image of the projection plane, the height of the first image of the projection plane is equal to the height of the second image of the projection plane, M is the width of the first image of the projection plane or the width of the second image of the projection plane, N is a height of the first image of the projection plane or the height of the first image of the projection plane, $T_1$, is an empiric value.

15. The method of claim 9, wherein step of projecting the key area having keys onto the projection plane comprising:
obtaining coordinates of the user and providing the key area having the keys to a position of the user; and
step of real-timely obtaining coordinates of the keys further comprising:
updating the keyboard template image;
updating the key template image;
real-timely obtaining a panoramic image;
matching the panoramic image with a keyboard template image to obtain a keyboard image;
matching the keyboard image with a key template image to obtain a key image; and
obtaining the coordinates of keyboards from the key image.

16. The virtual keyboard system of claim 1, wherein the key area having the keys is provided to the position of the user using formulas as following: $h=\sqrt{x^2+y^2}$, $\alpha=\arg\tan(x/y)$, $\alpha_0=\arg\tan(x/h)$, $\beta=\alpha-\alpha_0$, wherein (x, y) are coordinates of the user relative to the projector located in a horizontal plane, the coordinates of the user may be obtained by an indoors positioning system, $\alpha$ is an angle projected on the horizontal plane and formed by a reference line and a straight line connected by the projector and the user, $\alpha_0$ is an angle projected on the horizontal plane and formed by the reference line and a projective line emitted by the projector, and $\beta$ is a horizontal angle that the controller controls the rotating device to drive the projector to rotate at the horizontal plane.

* * * * *